April 23, 1957  F. F. WASSER ET AL  2,789,833
SECURING DEVICE
Filed April 25, 1956

INVENTORS
Forrest F. Wasser
Carl H. Hook
BY Beale and Jones
ATTORNEYS

000000000000000000000000000000000000000000000000000000000United States Patent Office
2,789,833
Patented Apr. 23, 1957

1

2,789,833

SECURING DEVICE

Forrest F. Wasser, Columbia, and Carl H. Hook,
West Columbia, S. C.

Application April 25, 1956, Serial No. 580,483

8 Claims. (Cl. 280—400)

This invention relates to a securing device for towing elongated articles. More specifically, this invention relates to a clamp adapted to engage a pole, log, post, or the like, said clamp having suitable means for attachment to a draft vehicle. Our device is especially adapted for use in the hauling of long poles, for instance light and telephone poles, which are supported at the trailing end by a pair of wheels and at the forward end by the draft vehicle.

An object of this invention is to provide an inexpensive clamp which is rugged and durable and capable of withstanding great loads and shocks.

Another object of this invention is to provide a clamp which may be securely attached to an article, said clamp being provided with pins which actually impale the clamped article, preventing relative movements between the clamp and the article.

Another object of this invention is to provide a clamp of extremely adjustable and versatile nature, adapted to be secured to objects of irregular cross section.

Still another object of this invention is to provide a clamp which can be easily and quickly applied to an article and just as readily be removed therefrom.

It is often necessary to transport over highways elongated articles such as telephone poles. Such transportation can be accomplished by means of a truck with a long wheel base. However, even if such a truck is used, the transported article usually projects beyond the length of the truck, creating road hazards.

Elongated articles may also be carried by means of a trailer comprising a set of wheels and a tongue or load-bearing platform perpendicular to the axle of said wheels and attached to the rear of the draft vehicle. This latter means of transportation reduces the hazards of the poles projecting from the floor of the truck and is less dangerous because such a draft vehicle with trailer as last described is articulated and the motions of the trailing end of the pole are easier for the motorist in the following car and others to predict. Also a trailer-type carrier is less expensive than a truck with a long wheel base.

Our invention uses the basic idea of a trailer with a set of wheels supporting the elongated transported objects but, at the same time, reduces the expense of the trailer in that it obviates the necessity for a tongue or load-bearing platform. In our invention one of the poles, or other elongated articles, is actually used as the tongue of the trailer, and our invention is specifically directed to means for attaching the forward end of this elongated article used as the trailer tongue to the draft vehicle.

The accompanying drawings forming a part of this application and in which like numerals are employed to designate like parts throughout the same.

2

Figure 1:
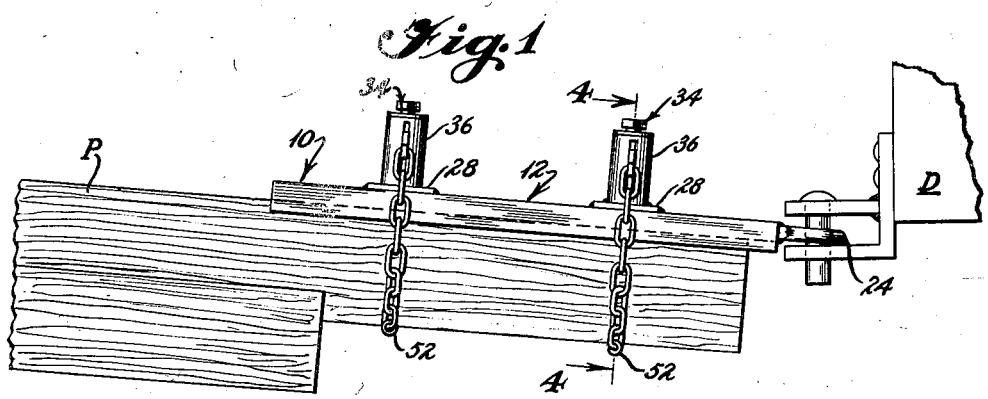
Fig. 1 is a side view of the clamp in use, showing its attachment to a draft vehicle.
Figure 2:
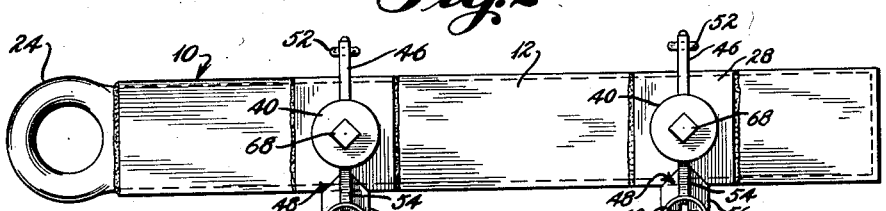
Fig. 2 is a top view of the clamp.
Figure 3:
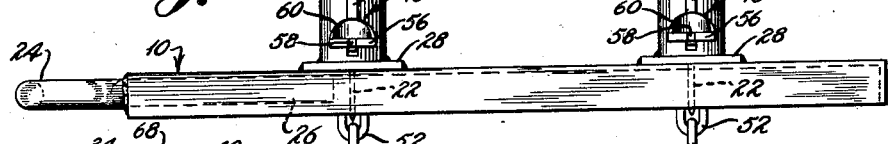
Fig. 3 is a side view of the clamp.
Figure 5:
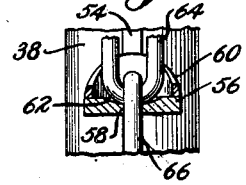
Figure 4:
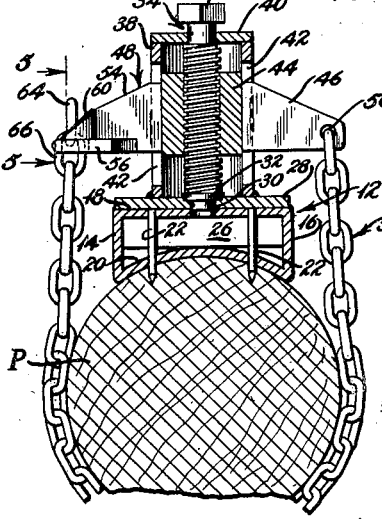
Fig. 4 is a cross sectional view taken along the line

4—4 of Fig. 1 and showing the clamp as applied to a wooden pole;

Fig. 5 is a fragmentary sectional view taken along the line 5—5 of Fig. 4 and showing details of the quick-release structure.

In the drawings, wherein for the purpose of illustration is shown a preferred embodiment of our invention, the numeral 10 designates our pole hitch clamp. In Fig. 1 it is shown in use attached to a pole P and also engaging the draft vehicle D. Our clamp preferably comprises an elongated hollow, generally rectangular bed member 12. As shown in Fig. 4 the member 12 includes the vertical sides 14 and 16, the top 18, and the concave lower side 20. A plurality of vertical pins 22 project downwardly from the concave side 20, and in use, impale the transported pole P. For extra strength, these pins are long enough to extend inwardly through the curved side 20 and into suitable apertures in the top side 18 of the elongated member 12. These pins are secured to the member 12 as by welding. To facilitate the impaling of the pole by the pins 22, the pins are sharpened at their lower ends.

At one end of the hollow member 12 is disposed a towing eye 24 or other attaching member, for use as a hitch to the draft vehicle D. The eye 24, preferably formed in a casting operation, is integral with a stub 26 which is adapted to be inserted into the hollow member 12 and to be welded thereto.

Spaced portions of the upper surface of top 18 of the elongated member 12 are superposed by the pedestal plates 28. The latter are secured to the member 12 in any suitable manner. A hole 30 extends through each pedestal plate 28 in a central portion thereof and also through an aligned area in the top 18 of member 12. These holes serve as a bearing for the lower end journal caps 32 of the screws 34 housed in the bosses 36. Each boss 36 and its associated parts are identical with the other bosses and for purposes of illustration this description will cover any one of them.

The boss 36 (see Fig. 4) supporting the screw 34 comprises a hollow cylindrical member having the sides 38 and the top 40 which is centrally apertured to receive the screw 34, and serve as a top bearing therefor. The cylindrical sides 38 are formed with diametrically opposed slotted zones 42 and are welded at the bottom to the underlying pedestal plate 28. The screw 34, which can be of relatively coarse thread, receives the traveling nut 44 within the boss 36. The nut is cylindrical and is of such size that it easily clears the inside surfaces of the boss 36. Extending outwardly in radial direction from diametrically opposed sides of the nut are the wings or ears 46 and 48. These ears extend through the slotted zones 42 and their abutment with the sides of the boss adjacent the slotted zones keep the nut from turning.

The ears 46 and 48 are not identical. The ear 46 is preferably of trapezoidal shape and has near its outward end an aperture 50 which receives the end of a chain 52 or other pole-encircling member. Preferably, the connection between the ear 46 and the chain 52 is a pivotal one so that the chain can more readily accommodate various sizes of poles. The ear 48 is of more complicated structure than the ear 46. It engages the other end of the pole-encircling member, and in the preferred form it comprises a vertical plate 54 to the underside of which is joined a horizontal shelf or flange 56. The vertical plate 54 is truncated as compared with the corresponding plate of the ear 46, and the horizontal flange 56 extends outwardly beyond the terminal of the vertical plate. The flange 56 is slotted as at 58 (see Fig. 5) along its center line. About this slot, a more or less semicircular reinforcing web 60 is welded or otherwise joined as said reinforcing plate is also joined to the vertical plate at its outer end. Preferably, the top surface of the reinforcing web 60 slopes downwardly from its joint with the vertical plate to meet the flange 56. In order that the free end of the chain 52 may engage the slot with better security, the flange 56 is milled out transversely in the form of the arc 62 as shown in Fig. 5. Such milling obviates the possibility of the chain link 64 slipping off the outward end of the flange 56.

The use of our pole clamp is apparent from the drawings and foregoing description of its structure. Suffice it to say, one end of the pole or poles to be transported is supported by a conventional two-wheel axle assembly which can be attached to the transported poles by chain or the like. If a group of poles are to be carried, they are bound in a bundle. At the other end a suitable pole, preferably a projecting one as shown in Fig. 1, is chosen for the attachment for our pole hitch clamp. The top side of the pole is then superposed by our clamp, the concave side 20 of the elongated member 12 adjacent the pole. The chain 52 then is passed under the pole and a suitable link (as 66) is introduced into the slot on the flange 56. The screw 34 is tightened by a suitable wrench engaging the head 68 thereby raising the nut 44 upwardly from the pole and tightening the chain 52 until the pins 22 impale the pole and the undersurface of the concave side 20 abuts the pole. With the clamp thus attached to the forward end of the pole, this end is raised as by jack or man-power until the eye 24 is maneuvered to engage the draft vehicle towing attachment. With the eye locked in engagement with said attachment, the forward end of the pole P is securely supported and the poles are ready for transport.

From the foregoing it is obvious that we have provided a comparatively simple and inexpensive yet durable pole hitch clamp. This device is readily attachable and detachable and obviates the necessity for a tongue on a pole-carrying trailer, thereby reducing the expense and weight of the trailer unit.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. A securing device comprising an elongated bed member, one side of which is concave and adapted to engage a towed article, said bed member provided at one end with an eye adapted to engage a draft vehicle, said bed member having at least one boss on the opposite side of said bed from said concave side, each boss being hollow and having diametrically opposed slotted zones, each of said bosses containing a screw extending perpendicular to said bed member, one end of said screw bearing against said bed member, said screw carrying a nut having ears on opposite sides thereof, said ears extending out through said slotted zones in said boss, and a towed article-encircling member having the ends thereof attached respectively to said ears.

2. A securing device as in claim 1 in which at least one connection between the towed-article-encircling member and said ears is releasable.

3. A securing device as in claim 1 in which at least one of said ears is slotted to removably receive one end of the towed-article-encircling member.

4. A securing device as in claim 1 in which the concave side of said bed member is provided with at least one towed-article-impaling pin.

5. A securing device as in claim 4 in which said pin is sharpened at its towed-article-impaling end.

6. A securing device comprising, in combination, a hollow bed member of elongated rectangular shape having a concave lower side, a top of like rectangular shape spaced therefrom and elongated sides connecting the lengthwise edges of said lower and top sides, a stub member received and secured within one end of said hollow bed member, a towing eye secured to said stub member and projecting outward from and lying in the elongated direction of said bed member, a pair of pedestal plates secured to said top of the bed member in spaced apart position in the elongated direction of said bed member, a hollow boss member attached to and extending perpendicular from each of said pedestal plates in a direction opposite to said concave side, said boss members having diametrically opposed slotted zones in the sides thereof, a nut received within said hollow boss and having diametrically outwardly projecting ears extending through the respective slotted zones in said boss, a screw extending through said hollow boss and threadedly received in said nut and having its lower end bearing against said pedestal plate and a towed-article-encircling member having the ends thereof attached respective to said ears.

7. A securing device according to claim 6 wherein said pedestal plate portion adjacent the lower end of said screw is apertured, said lower end of the screw being formed with an end cap adapted to be received and bear in said aperture of the pedestal plate.

8. A securing device as in claim 7 in which a plurality of spaced-apart impaling pins project from said concave side of the hollow bed member.

References Cited in the file of this patent
UNITED STATES PATENTS

| | | |
|---|---|---|
| 601,370 | Cohalan | Mar. 29, 1898 |
| 1,760,130 | Forrest | May 27, 1930 |

FOREIGN PATENTS

| | | |
|---|---|---|
| 203,357 | Switzerland | Aug. 1, 1939 |